United States Patent [19]
Kindinger et al.

[11] Patent Number: 5,355,518
[45] Date of Patent: Oct. 11, 1994

[54] RECEIVER WITH CONSTANT BATTERY SAVING DUTY CYCLE

[76] Inventors: Peter A. Kindinger, 75 Briargate Rd., Cary, Ill. 60013; James C. Knutsen, 227 Golfview Ter., Palatine, Ill. 60067; Kevin J. Kuehr, 716 Cimarron Dr., Cary, Ill. 60013; James E. Eppley, 1282 William Dr., Lake Zurich, Ill. 60047

[21] Appl. No.: 888,932

[22] Filed: May 26, 1992

[51] Int. Cl.$^5$ ............................................. H04B 1/16
[52] U.S. Cl. .................................. 455/38.3; 455/229; 455/343
[58] Field of Search ...................... 455/343, 38.3, 229, 455/227; 340/825.44, 825.47

[56] References Cited
U.S. PATENT DOCUMENTS

| | | | |
|---|---|---|---|
| 4,385,398 | 5/1983 | Wycoff et al. | 455/343 |
| 4,419,765 | 12/1983 | Wycoff et al. | 455/38.3 |
| 4,964,121 | 10/1990 | Moore | 455/343 |
| 5,109,530 | 4/1992 | Stengel | 455/343 |
| 5,193,211 | 3/1993 | Nobusawa | 455/38.3 |

*Primary Examiner*—Edward F. Urban
*Assistant Examiner*—Mark D. Wisler

[57] ABSTRACT

A receiver (100) for receiving a carrier signal to produce a recovered signal provides increased battery savings. The receiver (100) includes a detector (10) for detecting the absence of the carrier signal and a detector for detecting the presence of a valid coded squelch signal (87). The receiver (100) is placed in a first battery saver mode (41) having a duty cycle of a first ON time period and a first OFF time period, in response to the detected absence of the carrier signal. On the other hand, if the presence of the carrier signal is detected, without the presence of a valid coded squelch signal, the receiver (100) is placed in a second battery saver mode (42). The second battery saver mode has the same duty cycle as the first battery saver mode, but the second battery saver mode has longer ON and OFF time periods than the first time periods.

7 Claims, 3 Drawing Sheets

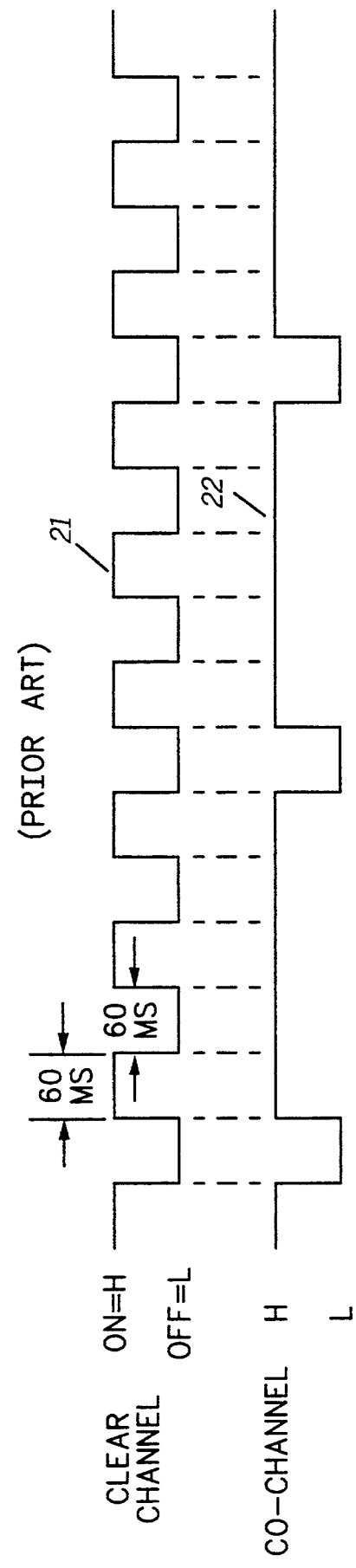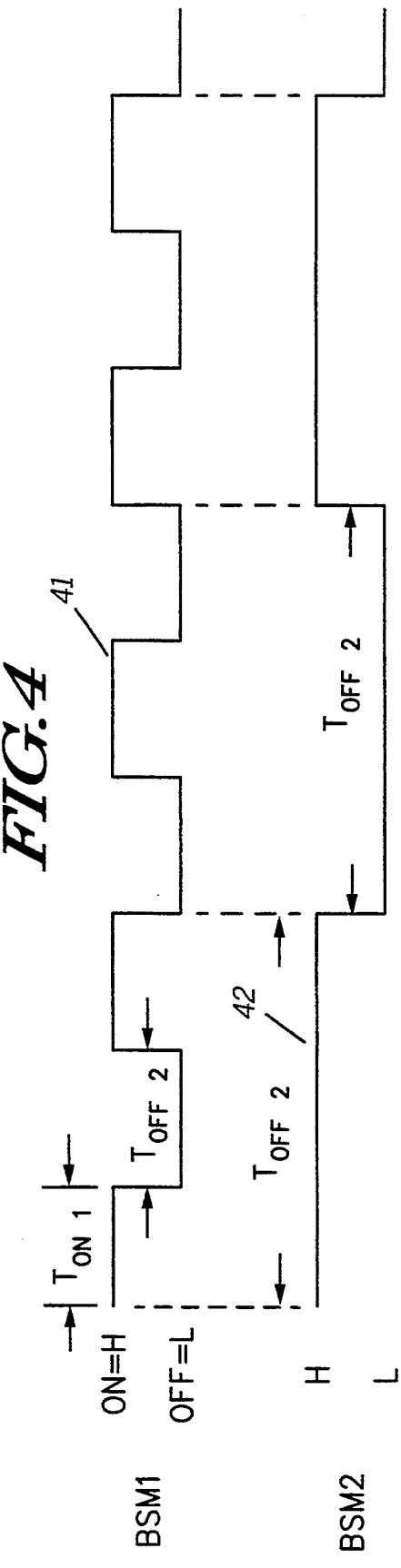

RECEIVER WITH CONSTANT BATTERY SAVING DUTY CYCLE

TECHNICAL FIELD

This invention relates generally to receivers and is more specifically related to receivers having a battery saver circuit.

BACKGROUND

Battery saving circuits are used to minimize power consumption, or average current drained, by periodically, rather than continuously, supplying power to a receiver. Presently known circuits operating in radio receivers, search for the presence of an RF (radio frequency) carrier, as seen in waveform 21 of FIG. 2 during a clear channel operation. If a carrier is found, the receive or search time is extended, from 60 milliseconds to 300 milliseconds, to permit a further search for a valid coded squelch signal (CSS), as seen in waveform 22. Examples of coded squelch signals are the tone-coded squelch (TPL) and digital-coded squelch (DPL) in Motorola products. (TPL and DPL are both Motorola trademarks.) Coded voice transmissions enable the unsquelching (or unmuting of the speaker) of only the radios having a code matching (or validating) the received CSS signal to provide private conversations with selected users on the same RF channel.

Such coded squelch operated battery savers have a significant disadvantage in that every receiver within a system is switched ON longer to enable detection of the CSS, whenever any transmission of a carrier signal occurs, regardless of which individual receiver is intended to be reached. In addition, even if the correct CSS signal is not detected, the OFF period for these coded conventional squelch operated battery savers remains the same, at 60 milliseconds, as the OFF period during receiver sampling for the carrier signal. Since the ON time has increased while the OFF time is unchanged, the duty cycle proportionately decreases, from 1-to-1 (50%) to 5-to-1 (17%). Hence, when there is such co-channel activity, demonstrated by the presence of a carrier signal, with the wrong CSS signal detected, current saving is decreased because of the smaller duty cycle.

SUMMARY OF THE INVENTION

Briefly, according to the invention, a receiver for receiving a carrier signal to produce a recovered signal provides increased battery savings. The receiver includes a first detector for detecting the absence of the carrier signal and a second detector for detecting the presence of a non-valid coded squelch signal. The receiver is placed in a first battery saver mode having a duty cycle of a first ON time period and a first OFF time period, in response to the detected absence of the carrier signal. On the other hand, if the presence of both the carrier signal and the non-valid coded squelch signal are detected, the receiver is placed in a second battery saver mode having the same duty cycle as the first battery saver mode, but the second battery saver mode having a second ON time period and a second OFF time period, both second periods being longer than the first time periods.

BRIEF DESCRIPTION OF THE DRAWINGS

FIG. 2 is a time chart for use in describing operation of a prior art receiver during a "clear channel" detection as compared to a "co-channel" detection.

FIG. 4 is a time chart for use in describing operation of the receiver of FIG. 1 during a "clear channel" detection as compared to during "co-channel" detection.

DETAILED DESCRIPTION OF THE PREFERRED EMBODIMENT

Figure 1:
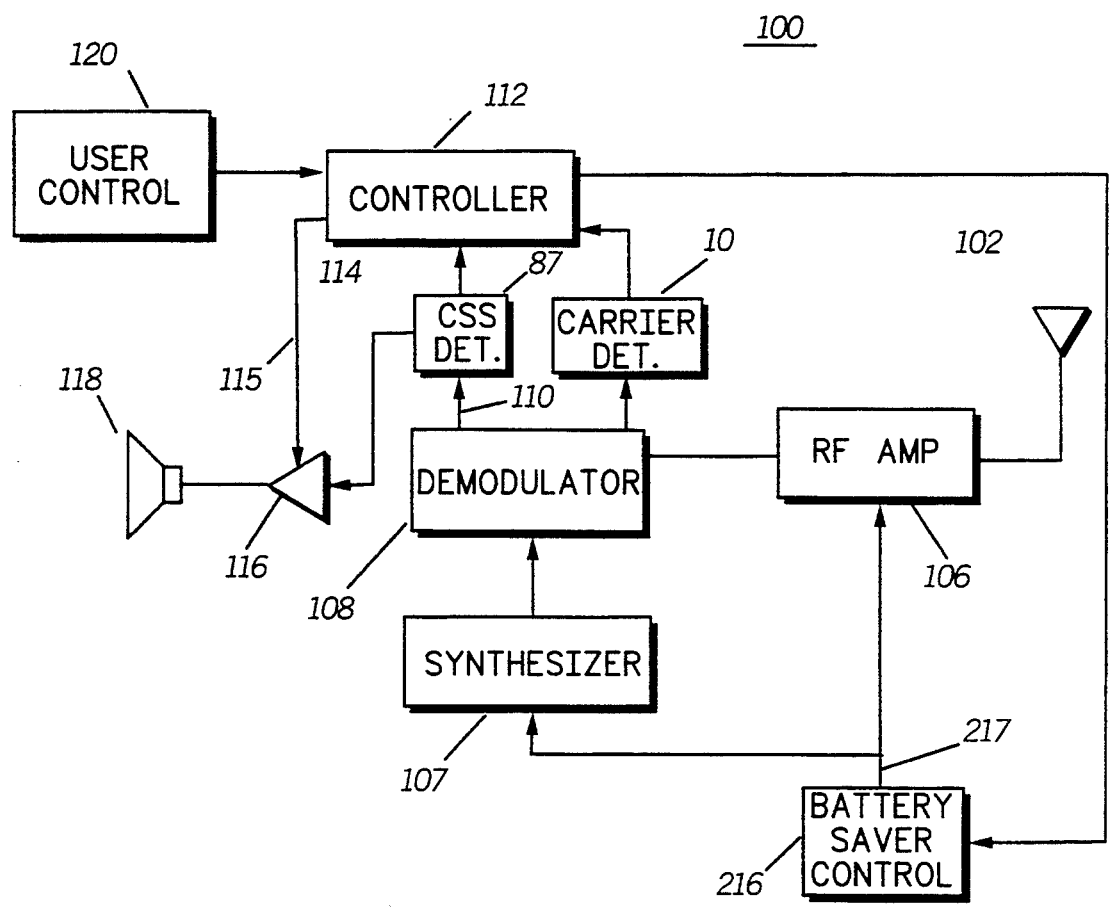
FIG. 1 shows a block diagram of a receiver in accordance with the present invention.

Referring to FIG. 1, a receiver 100 of a portable two-way radio (capable of both receiving and transmission) is shown in accordance with the present invention. The receiver 100 includes an RF amplifier 106, a synthesizer 107, a demodulator 108, an audio amplifier 116, a CSS detector 87, a speaker 118, and a controller 112, commonly implemented as a microprocessor.

To receive a message, a radio frequency (RF) signal with a coded squelch signal (CSS), if present on a channel, is routed from an antenna 102 to the demodulator 108 by the RF amplifier 106. After the receiver is switched to the correct receiving frequency by the synthesizer 107, the demodulator 108 receives a carrier signal, modulated with the coded squelch signal and other information, to produce a recovered or demodulated signal.

After demodulating the incoming RF signal, the demodulator 108 submits portions of it to the carrier signal detector 10. The carrier detector 10 provides a noise signal indicating the presence or absence of an RF carrier signal.

When an RF carrier signal appears with a valid or correct CSS, the output from the CSS detector 87 and the output from the carrier signal detector 10 are both coupled to the controller 112. In response, the controller 112 enables the audio amplifier 116, with a mute control signal 115, to unmute a speaker 118.

The demodulated signal 110 is supplied to the CSS detector 87 where the CSS is stripped from the voice information. The presence of a non-valid CSS is detected by the detector 87 and is subsequently coupled to the controller 112.

The CSS detector 87 detects and decodes a valid or non-valid CSS using any well-known techniques. One available method by which the detector 87 decodes the received CSS is by comparing it to a bank of available CSSs stored in a memory (not shown) to determine which one has been received. Alternatively, the CSS detector 87 could simply determine whether the received CSS matches it's own code. Finally, the stripped voice output from the CSS detector 87 is coupled to the audio amplifier 116, after the amplifier 116 has been enabled by the controller 112, from the correct code matching performed at the CSS detector 87.

Even though the detectors 10 and 87 are shown separately, they may both be included in the controller 112, for detecting the presence of a carrier and a coded squelch signal, respectively. Whether within or outside the controller, these detectors 10 and 87 assist the controller 112 in determining whether a switch to battery saver mode (BSM) is appropriate. According to the invention, the controller 112 evaluates the operation of the receiver 100 and determines whether the receiver 100 can be placed in the battery saver mode (BSM) having submodes BSM1 and BSM2.

An operator of the radio can also program the controller 112, using the user control 120, to selectively define a battery saver mode for each available channel. The programmable choices may include turning OFF battery savings, altogether, for one channel while selecting an arbitrary duty cycle for the battery saver mode on another channel.

The battery saver mode (BSM) is defined as the OFF time when certain elements of the receiver 100, such as the synthesizer 107, and the RF amplifier 106, are either inactivated or in a standby mode. During this OFF period, only minimal switching and timing circuits are functioning to coordinate the various states of the receiver 100, resulting in reduced energy consumption. The opposite state of the BSM is referred to as the receiver ON state. The receiver ON state is defined as the period that all the components of the receiver are turned ON, either receiving and processing a signal with a valid CSS or checking the contents of a nonvalid CSS to determine its next state, as will be described later in reference to FIG. 3.

After the result of the CSS comparison information (valid or invalid CSS) is provided to the controller 112, an output of the controller 112 is connected to a battery saver control 216. The battery saver control delivers a battery saving control signal 217 to the synthesizer 107 and RF amplifier 106, among other receiver components, to switch the states of the receiver 100, as applicable.

In the event that the received channel is clear (i.e., there is no detection of a carrier signal), the controller 112 sends a "switch to BSM1 for clear channel" signal to the battery saver control 216. In response, the battery saver control 216 provides the battery saving control signal 217 having a battery saving control waveform 41, as seen in FIG. 4. The battery saving control signal 217 initially takes a high level H to enable the receiver ON for a first predetermined interval of time $T_{on1}$. Thereafter, the battery saving control signal 217 is turned into a low level L to inactivate, or turn OFF, portions of the receiver 100 which lasts a predetermined interval $T_{off1}$. Thus, the battery saving control signal 217 alternatingly takes the low and high levels, at the predetermined intervals $T_{on1}$ and $T_{off1}$, respectively, for a first duty cycle. The duty cycle can be defined in total OFF time percentage as $(T_{offx}*100)/(T_{onx}+T_{offx})$, where the variable x is equal to 1 for a first set of OFF and ON times (i.e., $T_{off1}$ and $T_{on1}$), x is equal to 2 for a second set of OFF and ON times, etc. Although the duty cycle has been expressed in total OFF time percentage form, it can also be expressed in a number of other ways such as by the total On time percentage, etc. Hence, the predetermined intervals $T_{on1}$ and $T_{off1}$ may be, for example, 100 milliseconds each to provide a resultant 50% or a one-to-one duty cycle. For further battery savings, a selectable duty cycle having, for example, a $T_{on1}$ of 100 milliseconds and a $T_{off1}$ of 300 milliseconds may be chosen, by the radio operator, to provide a 75% OFF time duty cycle or a three-to-one duty cycle for the radio receiving in any channel selected.

However, according to the invention, once a carrier signal is detected, without the presence of a valid CSS, the controller 112 of FIG. 1 sends another signal to the battery saver control 216, to change the OFF time to a second longer time constant to maintain the same duty cycle with the longer ON time required for CSS detection, as seen in waveform 42 of FIG. 4. The battery saving control signal 217 now takes a high level H to enable the receiver ON for a second predetermined interval of time $T_{on2}$ that is longer than $T_{on1}$. Thereafter, the battery saving control signal 217 is turned into a low level L for a predetermined interval $T_{off2}$ that is longer than $T_{off1}$. Thus, the battery saving control signal 217 alternatingly takes the low and high levels, at the predetermined intervals $T_{on2}$ and $T_{off2}$, respectively, for a second duty cycle that is designed to be the same as the first duty cycle. Hence, the second predetermined intervals $T_{on2}$ and $T_{off2}$ may be, for example, 300 milliseconds each to result in the same 50% or the one-to-one duty cycle of waveform 41. Again, for further battery savings, a $T_{on2}$ of 300 milliseconds and a $T_{off2}$ of 900 milliseconds may be chosen to provide the same 75% OFF time duty cycle or the three-to-one duty cycle of waveform 42. As long as the wrong CSS code is detected, the receiver 100 remains in this "co-channel activity" submode BSM2 to allow for a possible future correct CSS detection.

On the other hand, after both the carrier and the valid coded squelch signals are detected, during a normal operative receive mode, a signal to stop the BSM is sent to the battery saver control 216. This would result in the receiver 100 remaining in the ON state. After the two-way conversation has ended for a substantial time, and the channel is clear again, the battery saver cycle will be restarted.

Figure 3:
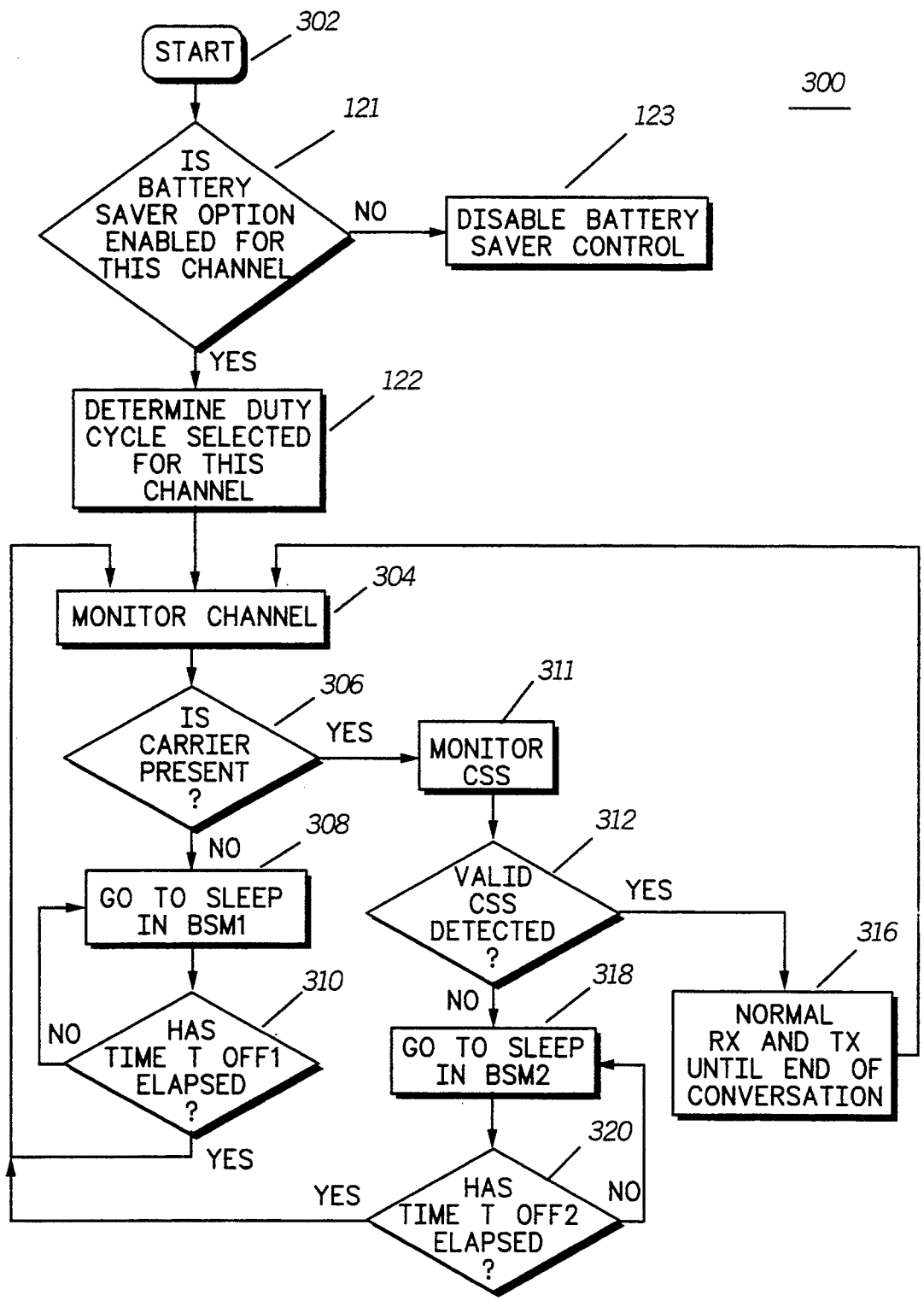
FIG. 3 is a flow chart of the receiver of FIG. 1, in accordance with the present invention.

Referring to FIG. 3, a flow chart 300 of the operation of receiver 100 is shown in accordance with the present invention. As is known in the art, the controller 112 or any other elements of the receiver 100, may be programmed to perform the details of the flow chart 300. From the start block 302, various programmable options, as selected by the operator, on the user control 120 of FIG. 1, are determined. If the battery saver option is not enabled (NO path of decision block 121) on this channel, the battery saver control 216 of FIG. 1 is also not enabled in block 123. Otherwise (YES path of decision block 121), the duty cycle defined by the user, is determined in block 122, to set the values for the time constants of FIG. 4: $T_{on1}$, $T_{off1}$, $T_{on2}$, and $T_{off2}$.

In a "monitor channel" block 304, the receiver 100 is turned ON, for the duration $T_{on1}$ of FIG. 4, and monitoring the air waves for any carrier signals that may be on the same frequency, as that of the receiver 100. The output of the "monitor channel" block 304 is connected to a condition block 306 where a decision is made as to whether a carrier signal of the correct frequency has been detected. If the channel is clear, the NO output of the decision block 306 is connected to a "go to sleep in BSM1" block 308 where portions of the receiver 100 is put to sleep in the battery saver mode BSM1. The output of the "go to sleep in BSM1" block 308 is connected to a timer represented by a decision block 310. At this decision block 310, the time that portions of the receiver 100 has been turned OFF in the BSM1 is compared to $T_{off1}$ of FIG. 4. The YES output of the decision block 310, which indicates that $T_{off1}$ has elapsed, is routed back to the "monitor channel" block 304. The NO output of the decision block 310 is looped back to the "go to sleep in BSM1" block 308.

On the other hand, if the presence of a carrier is detected, the YES output of the decision block 306 is connected a "MONITOR CSS" block 311 for an extended time duration of $T_{on2}-T_{on1}$. The receiver ON time is extended to allow time for CSS detection.

During this extended receive time, a decision block 312 determines whether a valid CSS code has been detected. If an incorrect CSS code is detected, denoting co-channel activity, the BSM2 is started in a "GO TO SLEEP IN BSM2" block 318. The output of the "go to sleep in BSM2" block 318 is connected to a timer represented by a decision block 320. At this decision block 320, the time that portions of the receiver 100 has been turned OFF in the BSM2 is compared to $T_{off2}$ of FIG. 4. The YES output of the decision block 320, which indicates that $T_{off2}$ has elapsed, is routed back to the "monitor channel" block 304 where the BSM2 cycle of periodically checking for a valid CSS code continues. This looping back of the decision block 320 to the "monitor channel" block 304 provides the means for periodically monitoring the recovered signal for a valid CSS during the ON time $T_{on2}$ of the BSM2. The NO output of the decision block 320 is looped back to the "go to sleep in BSM2" block 318.

The YES output of the decision block 312 is connected to a normal operation block 316, where the receiver 100 is ON, entirely, during the receive mode of the radio's normal operation. The normal operation of transmit (TX) and receive (RX) operations are continued until the end of the conversation, which is deemed to have occurred when neither the transmit nor receive operation occurs for 15 seconds. After this end of the two-way conversation, the operation returns to block 304.

In summary, after the receiver detects the absence of a carrier signal, the receiver goes to sleep in a BSM1. On the other hand, if the carrier signal is detected, but without a valid CSS being detected also, the receiver is changed to a BSM2. BSM2 has the same duty cycle as BSM1, even though the ON and OFF periods of BSM2 are each longer than the ON and OFF periods of BSM1.

What is claimed is:

1. A method for saving battery energy in a radio, having a receiver for receiving a carrier signal to produce a recovered signal, the method comprising the steps off placing said radio in a first battery saver mode having a duty cycle determined by a first ON time period and a first OFF time period;

detecting the absence of the carrier signal during said first ON time period;

maintaining said radio in said first battery saver mode in response to the detecting of the absence of the carrier signal, said first battery saver mode having said first OFF time period for allowing said radio to sleep;

detecting the presence of the carrier signal during said first ON time period;

placing said radio, in a second battery saver mode, in response to the detected presence of the carrier signal, the second battery saver mode having the same duty cycle as the first battery saver mode, but the second battery saver mode having a second ON time period and a second OFF time period, both second periods being longer than said first time periods;

detecting the presence of a non-valid coded squelch signal in said recovered signal during said second ON time period; and maintaining said radio, in said second battery saver mode, in response to the detected presence of the carrier signal and the detected presence of the non-valid coded squelch signal, the second battery saver mode having said second OFF time period, said second OFF time period extended longer from said first OFF time period for allowing said radio to sleep longer to maintain the same battery savings from said first battery saver mode, even with said longer second ON time period.

2. The method according to claim 1, further comprising the steps of:

periodically waking up and detecting whether a valid coded squelch signal is present in said recovered signal during said second ON time period; and returning to the second battery saver mode, in response to the detected absence of the valid coded squelch signal and the detected presence of the carrier signal.

3. A method for saving battery energy in a radio, having a receiver for receiving a carrier signal to produce a recovered signal, the method comprising the steps of:

determining a duty cycle selected for said radio, wherein said duty cycle is determined by a first ON time period and a first OFF time period;

placing said radio in a first battery saver mode having said duty cycle;

detecting the absence of the carrier signal during the first ON time period;

maintaining said radio in said first battery saver mode in response to the detecting of the absence of the carrier signal;

detecting the presence of the carrier signal during said first ON time period;

placing said radio, in a second battery saver mode, in response to the detected presence of the carrier signal, the second battery saver mode having the same duty cycle as the first battery saver mode, but the second battery saver mode having a second ON time period and a second OFF time period, both second periods being longer than said first time periods;

detecting the presence of a non-valid coded squelch signal in said recovered signal during said second ON time period; and maintaining said radio, in said second battery saver mode, in response to the detected presence of the carrier signal and the detected presence of the non-valid coded squelch signal.

4. A receiver comprising:

means for placing said receiver in a first battery saver mode having a duty cycle determined by a first ON time period and a first OFF time period;

means for receiving a carrier signal to produce a recovered signal;

means for detecting the absence of the carrier signal during said first ON time period;

means for maintaining said receiver in said first battery saver mode in response to the detected absence of the carrier signal;

means for detecting the presence of the carrier signal during said first ON time period;

means for switching said radio, from said first battery saver mode to a second battery saver mode, in response to the detected presence of the carrier signal, the second battery saver mode having the same duty cycle as the first battery saver mode, but the second battery saver mode having a second ON time period and a second OFF time period, both second periods being longer than said first time periods;

means for detecting the presence of a non-valid coded squelch signal in said recovered signal during said second ON time period; and means for maintaining said receiver, in said second battery saver mode, in response to the detected presence of the carrier signal and the detected presence of said non-valid coded squelch signal.

5. The receiver of claim 4 further including means for defining either of said battery saver modes on a channel-by-channel basis.

6. The receiver of claim 4 further including means for disabling either of said battery saver modes on a channel-by-channel basis.

7. The receiver of claim 4 further including means for varying said duty cycle of either of said battery saver modes on a channel-by-channel basis.

* * * * *